(12) United States Patent
Worrill et al.

(10) Patent No.: US 11,523,088 B2
(45) Date of Patent: *Dec. 6, 2022

(54) COMPUTER IMPLEMENTED SYSTEMS FRAMEWORKS AND METHODS CONFIGURED FOR ENABLING REVIEW OF INCIDENT DATA

(71) Applicant: Honeywell International Inc., Morris Plains, NJ (US)

(72) Inventors: Joshua Worrill, Newton (AU); Amelia Masters, Artarmon (AU)

(73) Assignee: Honeywell Interntional Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,402

(22) Filed: Nov. 14, 2019

(65) Prior Publication Data

US 2020/0092520 A1 Mar. 19, 2020

Related U.S. Application Data

(63) Continuation of application No. 14/524,912, filed on Oct. 27, 2014, now Pat. No. 10,523,903.

(30) Foreign Application Priority Data

Oct. 30, 2013 (AU) ................. 2013904189

(51) Int. Cl.
*G08B 13/196* (2006.01)
*H04N 7/18* (2006.01)
*H04N 5/76* (2006.01)

(52) U.S. Cl.
CPC ............. *H04N 7/181* (2013.01); *H04N 5/76* (2013.01); *H04N 7/188* (2013.01); *G08B 13/19669* (2013.01)

(58) Field of Classification Search
CPC .... G08B 13/19669; H04N 5/76; H04N 7/181; H04N 7/188
(Continued)

(56) References Cited

U.S. PATENT DOCUMENTS 3,753,232 A 8/1973 Sporer
3,806,911 A 4/1974 Pripusich
(Continued)

FOREIGN PATENT DOCUMENTS

AU 2011903153 * 8/2011
CA 2240881 12/1999
(Continued)

OTHER PUBLICATIONS

Publication date for the AU Provisional Specificaiton 2011903153.*
(Continued)

*Primary Examiner* — James T Boylan
(74) *Attorney, Agent, or Firm* — Seager, Tufte & Wickhem, LLP (57) ABSTRACT

A DVM system is configured to include an incident trigger, which is actuated either manually or automatically in response to an "incident. In response to the actuation of the trigger, an incident identifier is defined. During the period of actuation, a plurality of recordings is automatically made, based on an incident recording protocol. These recordings are all associated with the incident identifier. The automation allows an operator to, at the time of the incident, focus on factors other than ensuring important video evidence is being recorded (such as following a subject through a building by looking at various cameras). The association streamlines subsequent review of an incident, as recordings relevant to the incident are commonly identifiable based on the incident identifier.

20 Claims, 7 Drawing Sheets

(58) Field of Classification Search
USPC .................................................... 348/159
See application file for complete search history.

(56) References Cited

U.S. PATENT DOCUMENTS

| | | |
|---|---|---|
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,844,553 A | 12/1998 | Hao et al. |
| 5,914,875 A | 6/1999 | Monta et al. |
| 5,915,473 A | 6/1999 | Ganesh et al. |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Knifftn et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagashi |
| 6,453,426 B1 | 9/2002 | Gamache et al. |
| 6,453,687 B2 | 9/2002 | Sharood et al. |
| 6,476,858 B1 | 11/2002 | Diaz et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |

(56) References Cited

U.S. PATENT DOCUMENTS

| | | |
|---|---|---|
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,280,030 B1 | 10/2007 | Monaco |
| 7,283,489 B2 | 10/2007 | Palaez et al. |
| 7,310,817 B2 | 12/2007 | Hinchliffe et al. |
| 7,313,819 B2 | 12/2007 | Burnett et al. |
| 7,321,784 B2 | 1/2008 | Serceki et al. |
| 7,337,315 B2 | 2/2008 | Micali |
| 7,340,743 B1 | 3/2008 | Anural et al. |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,408,925 B1 | 8/2008 | Boyle et al. |
| 7,487,538 B2 | 2/2009 | Mok |
| 7,505,914 B2 | 3/2009 | McCall |
| 7,542,867 B2 | 6/2009 | Steger et al. |
| 7,543,327 B1 | 6/2009 | Kaplinsky |
| 7,574,734 B2 | 8/2009 | Fedronic et al. |
| 7,576,770 B2 | 8/2009 | Metzger et al. |
| 7,583,401 B2 | 9/2009 | Lewis |
| 7,586,398 B2 | 9/2009 | Huang et al. |
| 7,600,679 B2 | 10/2009 | Kshirsagar et al. |
| 7,634,662 B2 | 12/2009 | Monroe |
| 7,661,603 B2 | 2/2010 | Yoon et al. |
| 7,683,940 B2 | 3/2010 | Fleming |
| 7,735,132 B2 | 6/2010 | Brown et al. |
| 7,735,145 B2 | 6/2010 | Kuehnel et al. |
| 7,751,632 B2 | 7/2010 | Liu et al. |
| 7,794,536 B2 | 9/2010 | Roy et al. |
| 7,801,870 B2 | 9/2010 | Oh et al. |
| 7,818,026 B2 | 10/2010 | Hartikainen et al. |
| 7,839,926 B1 | 11/2010 | Metzger et al. |
| 7,853,987 B2 | 12/2010 | Balasubramanian et al. |
| 7,861,314 B2 | 12/2010 | Serani et al. |
| 7,873,441 B2 | 1/2011 | Synesiou et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 7,999,847 B2 | 8/2011 | Donovan et al. |
| 8,045,960 B2 | 10/2011 | Orakkan |
| 8,069,144 B2 | 11/2011 | Quinlan et al. |
| 8,081,205 B2 | 12/2011 | Baird et al. |
| 8,089,341 B2 | 1/2012 | Nakagawa et al. |
| 8,095,889 B2 | 1/2012 | DeBlaey et al. |
| 8,102,240 B2 | 1/2012 | Birchbauer et al. |
| 8,108,200 B2 | 1/2012 | Anne et al. |
| 8,166,532 B2 | 4/2012 | Chowdhury et al. |
| 8,179,227 B2 | 5/2012 | Dziadosz |
| 8,193,904 B2 | 6/2012 | Kwakita |
| 8,199,196 B2 | 6/2012 | Klein et al. |
| 8,204,273 B2 | 6/2012 | Chambers et al. |
| 8,222,990 B2 | 7/2012 | Gerner et al. |
| 8,232,860 B2 | 7/2012 | Goel |
| 8,272,053 B2 | 9/2012 | Markham et al. |
| 8,316,407 B2 | 11/2012 | Lee et al. |
| 8,341,695 B2 | 12/2012 | Thomas et al. |
| 8,347,216 B2 | 1/2013 | Shin et al. |
| 8,350,666 B2 | 1/2013 | Kore |
| 8,351,350 B2 | 1/2013 | Bhandari et al. |
| 8,374,480 B2 | 2/2013 | Liu |
| 8,413,227 B2 | 4/2013 | Chen |
| 8,443,437 B2 | 5/2013 | Srinivasa et al. |
| 8,479,029 B2 | 6/2013 | Adams et al. |
| 8,474,710 B2 | 7/2013 | Marcinowski et al. |
| 8,509,987 B2 | 8/2013 | Resner |
| 8,521,312 B2 | 8/2013 | Dongare et al. |
| 8,543,684 B2 | 9/2013 | Hulusi et al. |
| 8,554,865 B2 | 10/2013 | Dziadosz |
| 8,558,658 B2 | 10/2013 | Kumar et al. |
| 8,560,970 B2 | 10/2013 | Liddington |
| 8,598,982 B2 | 12/2013 | Bhandari et al. |
| 8,602,269 B2 | 12/2013 | Alluigi |
| 8,605,151 B2 | 12/2013 | Bellamy et al. |
| 8,680,995 B2 | 3/2014 | Ashwin et al. |
| 8,700,714 B1 | 4/2014 | Pan et al. |
| 8,707,414 B2 | 4/2014 | Roy et al. |
| 8,711,201 B2 | 4/2014 | Gorzynski |
| 8,731,895 B2 | 5/2014 | Anne et al. |
| 8,732,457 B2 | 5/2014 | Micali |
| 8,754,940 B2 | 6/2014 | Belsarkar et al. |
| 8,787,725 B2 | 7/2014 | Lee |
| 8,789,094 B1 | 7/2014 | Singh et al. |
| 8,875,031 B2 | 10/2014 | Periyannan et al. |
| 8,893,022 B2 | 11/2014 | Akram et al. |
| 8,922,658 B2 | 12/2014 | Galvin |
| 2001/0033330 A1 | 10/2001 | Garoutte |
| 2002/0011923 A1 | 1/2002 | Cunningham et al. |
| 2002/0022991 A1 | 2/2002 | Sharood et al. |
| 2002/0046337 A1 | 4/2002 | Micali |
| 2002/0118096 A1 | 8/2002 | Hoyos et al. |
| 2002/0121961 A1 | 9/2002 | Huff |
| 2002/0170064 A1 | 11/2002 | Monroe et al. |
| 2003/0033230 A1 | 2/2003 | McCall |
| 2003/0071714 A1 | 4/2003 | Bayer et al. |
| 2003/0174049 A1 | 9/2003 | Beigel et al. |
| 2003/0208689 A1 | 11/2003 | Garza |
| 2003/0233432 A1 | 12/2003 | Davis et al. |
| 2004/0062421 A1 | 4/2004 | Jakubowski et al. |
| 2004/0064453 A1 | 4/2004 | Ruiz et al. |
| 2004/0068583 A1 | 4/2004 | Monroe et al. |
| 2004/0087362 A1 | 5/2004 | Beavers |
| 2004/0125133 A1* | 7/2004 | Pea .................. G06F 16/40 715/751 |
| 2004/0143602 A1* | 7/2004 | Ruiz .................. H04N 7/181 |
| 2004/0205350 A1 | 10/2004 | Waterhouse et al. |
| 2005/0138380 A1 | 6/2005 | Fedronic et al. |
| 2005/0200714 A1 | 9/2005 | Marchese |
| 2005/0271250 A1* | 12/2005 | Vallone ............ H04N 21/44008 382/103 |
| 2006/0064477 A1* | 3/2006 | Renkis ............. G08B 13/19695 709/223 |
| 2006/0077262 A1 | 4/2006 | Miyamaki et al. |
| 2006/0017939 A1 | 6/2006 | Jamieson et al. |
| 2006/0171453 A1* | 8/2006 | Rohlfing .......... G08B 13/19656 375/240.01 |
| 2006/0279628 A1 | 12/2006 | Fleming |
| 2006/0288311 A1 | 12/2006 | Heer |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0060034 A1 | 3/2008 | Egnal |
| 2008/0173709 A1 | 7/2008 | Ghosh |
| 2008/0309760 A1 | 12/2008 | Joyner et al. |
| 2009/0018900 A1 | 1/2009 | Waldron et al. |
| 2009/0097815 A1 | 4/2009 | Lahr et al. |
| 2009/0228808 A1 | 9/2009 | MacDonald et al. |
| 2009/0258643 A1 | 10/2009 | McGuffin |
| 2009/0328203 A1 | 12/2009 | Haas |
| 2010/0026811 A1 | 2/2010 | Palmer |
| 2010/0064219 A1 | 3/2010 | Gabrisko et al. |
| 2010/0199340 A1 | 8/2010 | Jonas et al. |
| 2010/0220715 A1 | 9/2010 | Cherchali et al. |
| 2011/0043631 A1 | 2/2011 | Marman et al. |
| 2011/0071929 A1 | 3/2011 | Morrison |
| 2011/0153791 A1 | 6/2011 | Jones et al. |
| 2011/0225039 A1 | 9/2011 | Goldman et al. |
| 2012/0096131 A1 | 4/2012 | Bhandari et al. |
| 2012/0106915 A1 | 5/2012 | Palmer |
| 2012/0113265 A1* | 5/2012 | Galvin .............. H04N 5/23206 348/159 |
| 2012/0133482 A1 | 5/2012 | Bhandari et al. |
| 2012/0326868 A1 | 12/2012 | Goel |

(56) References Cited

U.S. PATENT DOCUMENTS

| | | | |
|---|---|---|---|
| 2013/0036356 A1* | 2/2013 | Worrill | H04N 7/181 715/719 |
| 2013/0054863 A1 | 2/2013 | Imes | |
| 2013/0194430 A1 | 8/2013 | Worrill | |
| 2013/0227437 A1 | 8/2013 | Brody et al. | |
| 2013/0263021 A1 | 10/2013 | Dunn et al. | |
| 2014/0006977 A1 | 1/2014 | Adams | |
| 2014/0125808 A1 | 5/2014 | Flannery | |
| 2014/0192192 A1 | 7/2014 | Worrill et al. | |
| 2014/0211027 A1 | 7/2014 | Worrill et al. | |

FOREIGN PATENT DOCUMENTS

| | | |
|---|---|---|
| CN | 1265762 | 9/2000 |
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/03 8727 | 4/2005 |
| WO | WO 2006/021047 | 3/2006 |
| WO | WO 2006/049181 | 5/2006 |
| WO | WO 2006/126974 | 11/2006 |
| WO | WO 2007/043798 | 4/2007 |
| WO | WO 2008/045918 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

"Certificate Validation Choices," CoreStreet, Inc., 8 pages, 2002.
"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
"Keyfast Technical Overview", Corestreet Ltd., 21 pages, 2004.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor—Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
"Method and System for Targeted Real-Time Collaborative Content Sharing Across Devices," ip.com No. 000211548, 3 pages, Oct. 11, 2011.
"Use of Multiple Instant Messaging Group Chats During Teleconferences with Geographically/Culturally/Language Dispersed Teams," ip.com No. 000194459, 4 pages, Mar. 25, 2010.
Gyorfi et al., "Sharing Local Content With Remote Clients in a Collaborative Virtual Environment," ip.com No. 000172771, Jul. 14, 2008.

* cited by examiner

COMPUTER IMPLEMENTED SYSTEMS FRAMEWORKS AND METHODS CONFIGURED FOR ENABLING REVIEW OF INCIDENT DATA

This application is a continuation of co-pending U.S. patent application Ser. No. 14/524,912, filed Oct. 27, 2014, which claims priority to Australian Patent Application No. 2013904189, filed on Oct. 30, 2013, entitled "COMPUTER IMPLEMENTED SYSTEMS, FRAMEWORKS AND METHODS CONFIGURED FOR ENABLING REVIEW OF INCIDENT DATA", both of which are incorporated herein by reference.

FIELD OF THE INVENTION

The present invention relates to computer implemented systems, frameworks and methods configured for enabling review of incident data. Embodiments of the invention have been particularly developed for operation in the context of incident-centric recording in a Digital Video Management (DVM) system. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

DVM systems are widely used for surveillance purposes. In such contexts, it is important to collect evidence for the purpose of "incident recording", that being recording relating to a particular "incident" (for example a break-in, altercation, emergency situation, or the like). For example, collecting of evidence is an extremely important aspect of incident management due to potential police involvement, subsequent legal proceedings, and training purposes. In known surveillance systems, evidence collection is generally achieved using a number of functionalities such as:

Automatic background recording on all cameras.
User or event driven recording on key cameras.
User initiated image snapshots.

Conventionally, such functionalities are either pre-configured, or must be triggered manually by the operator during an incident. This can lead to costly configuration, and additional stress on operators in an already stressful situation. It can also require time consuming analysis after the event, where one or more operators must manually reconstruct the event, finding appropriate video regions, and ordering them based on time or, for example, movements of a suspect.

PCT patent application PCT/AU2012/000914 teaches approaches for controlling a DVM system thereby to automate incident-based recording. For example, one embodiment provides a method for controlling a DVM system, the method including: providing an incident trigger; in response to actuation of the incident trigger, defining an incident identifier; during a period of time for which the incident trigger is actuated, applying an incident recording protocol, thereby to automatically make recordings in accordance with the incident recording protocol; and associating each of the DVM recordings with the incident identifier. This allows a collection of "incident data" to be defined, comprising DVM data associated with the incident. This need not only be defined by video recordings; it may include snapshots and other data types.

Whilst PCT/AU2012/000914 is effective in collating incident data, there remain challenges in enabling a user to efficiently review that data.

There is a need in the art for improved systems and methods for managing video data.

SUMMARY

It is an object of the present invention to overcome or ameliorate at least one of the disadvantages of the prior art, or to provide a useful alternative.

One embodiment provides a method for controlling a DVM user interface associated with a DVM system, the method including:

providing a first configuration of the DVM user interface at a client terminal operated by a user;

enabling the user to select an incident package, wherein the incident package is indicative of a set of recordings that are pre-associated with a defined incident, and a set of cameras responsible for the set of recordings that are pre-associated with the defined incident;

enabling the user to provide a command to launch the incident package in the DVM user interface; and in response to the command, providing a second configuration of the DVM user interface, wherein the second configuration of the DVM user interface is specifically configured to enable review of the incident package.

One embodiment provides a method for exporting an incident package in a viewable form, the method including:

identifying an incident package, wherein the incident package is indicative of a set of recordings that are pre-associated with a defined incident, and a set of cameras responsible for the set of recordings that are pre-associated with the defined incident;

defining data for enabling population of a DVM user interface with:
 (i) a hierarchical structure configured to present objects representing the set of responsible for the set of recordings that are pre-associated with the defined incident
 (ii) a timeline onto which the set of recordings are loaded;
wherein the DVM user interface is a standalone interface independent of a DVM system.

One embodiment provides a DVM system configured to perform a method as described herein.

One embodiment provides a tangible non-transitive carrier medium carrying computer executable code that, when executed via one or more processes, allows the performance of a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DESCRIPTION

Described herein are systems and methods for managing video data. Embodiments are described by reference to a Digital Video Management (DVM) system, for example in terms of methods for providing incident-centric recording in a DVM system. In overview, a DVM system is configured to include an incident trigger, which is actuated either manually or automatically in response to an "incident". In the case of manual actuation, the definition of an incident may be subjectively determined by an operator (for example based on training and/or protocols). In the case of automatic actuation, an incident is defined by predefined criteria (for example a signal from analytics software, and alarm, or the like). In response to the actuation of the trigger, an incident identifier is defined. During the period of actuation, a plurality of recordings is automatically made, based on an incident recording protocol. These recordings are all associated with the incident identifier. The automation allows an operator to, at the time of the incident, focus on factors other than ensuring important video evidence is being recorded (such as following a subject through a building by looking at various cameras). The association streamlines subsequent review of an incident, as recordings relevant to the incident are commonly identifiable based on the incident identifier.

Exemplary DVM System

Figure 1:
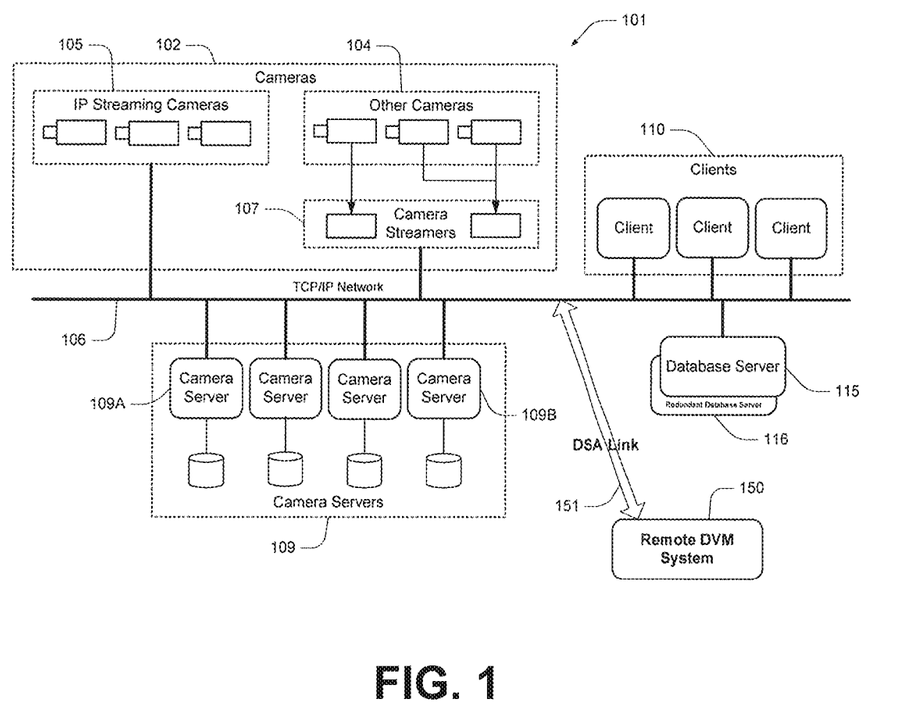
FIG. 1 schematically illustrates a DVM system according to one embodiment.

FIG. 1 illustrates an exemplary Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system, which may be present in various embodiments. In practice, many systems omit one or more of these features, and/or include additional features.

System 101 includes a plurality of video streaming units 102. Units 102 include conventional cameras 104 (including analogue video cameras) coupled to discrete video streaming units, and IP streaming cameras 105. Video streaming units 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a discrete video streaming unit 107 is required to convert a captured video signal into a format suitable for IP streaming.

For the purposes of the present disclosure, the term "video streaming unit" should be read to include IP streaming cameras 105 and video streaming units 107. That is, the term "video streaming unit" describes any hardware component configured to stream video data onto a network, independent of the source of the originating analogue video data.

For the present purposes, the terms "video streaming unit" and "camera" are generally used interchangeably, on the assumption that each video streaming unit corresponds to a unique set of optical components used to capture video. That is, there is a one-to-one relationship between streaming units 107 and cameras 104. However, in other embodiments there is a one-to-many relationship between streaming units 107 and cameras 104 (i.e. a streaming unit is configured for connection to multiple cameras).

One or more camera servers 109 are also connected to network 106 (these may be either physical servers or virtual servers). Each camera server is enabled to have assigned to it one or more of video streaming units 102. In some embodiments the assignment is on a stream-by-stream basis rather than a camera-by-camera basis. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the relevant streaming unit to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras or streaming units being assigned to a common camera server, this is a conceptual notion, and is essentially no different from a camera server being assigned to one or more cameras or streaming units.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Some embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture). In the context of FIG. 1, a remote system 150, communicates with the local system via a DSA link 151. For the present purposes, it is assumed that remote system 150 is in a general sense similar to the local system. Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

Incident Centric Recording

Figure 2:
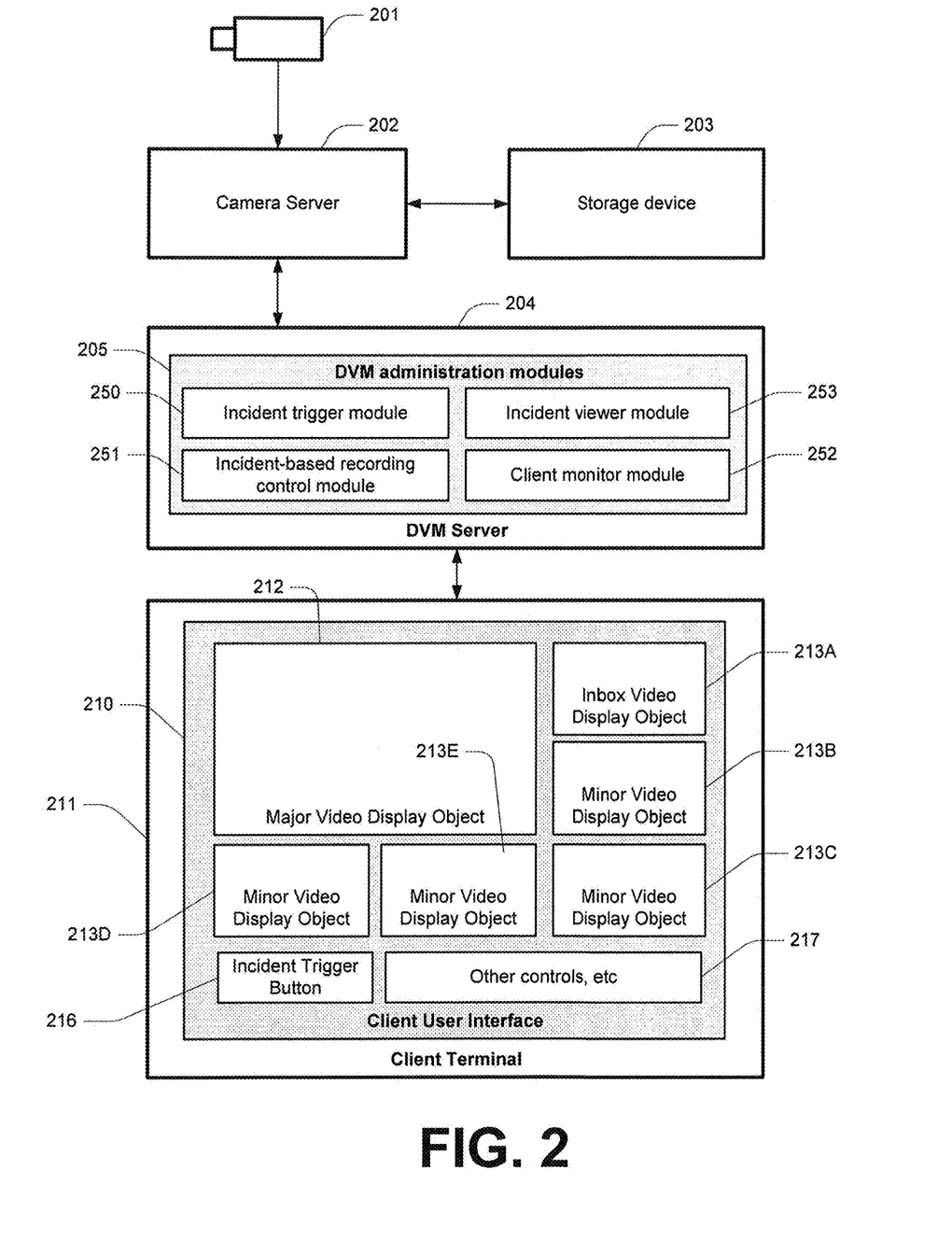
FIG. 2 schematically illustrates a DVM system according to one embodiment.

FIG. 2 illustrates components of an exemplary DVM system (such as the system of FIG. 1, but simplified to illustrate components relevant to incident-centric recording.

A camera 201 is associated with a camera server 202. Camera server 202 is configured to access video data made available by camera 201, either for live viewing or for recording to a storage device 203. Camera server 202 is configured/controlled by a DVM server 204. There are a number of further cameras and camera servers (for example with a plurality of cameras being assigned to each camera server), which are not illustrated in FIG. 2 for the sake of simplicity.

DVM server 204 executes DVM administration modules 205. The functional block for modules 205 is used to simplistically represent a wide range of software components implemented within a DVM system. A small selection of these components is illustrated in FIG. 2, and these are described in more detail further below.

DVM server 204 communicates with a user interface 210 which executes on a client terminal 211. In the present embodiment, this user interface is provided via various modules 205 (including modules that are not specifically illustrated) via a web-server type arrangement (i.e. user interface 210 is provided via a web-browser at terminal 211 which renders data transmitted by DVM server 204).

User interface 210 is configured to display live and recorded video data to a user via video display objects. In the example of FIG. 2, a plurality of display objects are shown as being rendered on-screen simultaneously, including a major display object 212 and minor display objects 213A-E. These are configured to each display live video data from respective cameras (such as camera 201). The size, geometric layout, and number of major/minor display objects is illustrative only, and is in some cases modifiable by a user or in response to other inputs. User interface 210 additionally includes an incident trigger button 216 and other controls 217 (which simplistically represents a variety of GUI controls available to an operator of terminal 211, such as record control, camera position control, camera view selection, and so on).

Figure 3A:
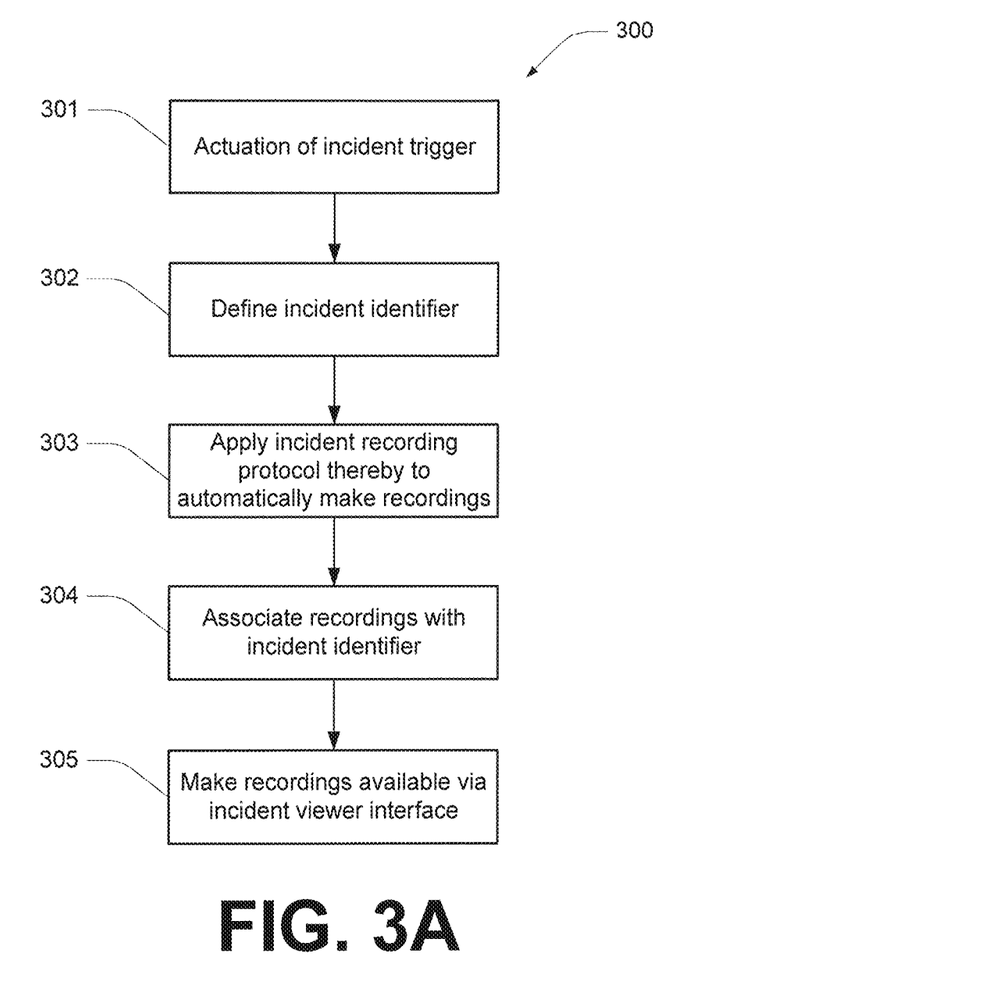
FIG. 3A illustrates a method according to one embodiment.

Operation of the arrangement of FIG. 2 relevant to incident centric recording is now described by reference to method 300 of FIG. 3A, which is performed by DVM server 204.

Module 250 provides an incident trigger, which is able to be actuated manually by an operator of terminal 211. Specifically, the incident trigger is actuated in response to an operator clicking button 216. In practice, an operator determines that an incident is occurring (for example based on training and/or defined surveillance protocols), and clicks button 216 thereby to incident centric recording. Clicking button 216 transmits a signal to server 204, thereby to actuate incident trigger module 250. In some embodiments trigger module 250 may be actuated automatically in response to predefined criteria being met. These criteria may include the triggering of an alarm or alarm condition in the DVM system, a signal from analytics software (for example analytics software configured to identify movement in a camera's field of view), or an assessment of activity levels at a client terminal (for example if operator activity exceeds a threshold level it may be deemed that an incident is underway). In the context of method 300, the incident trigger is actuated at 301.

Functional block 302 represents a process including, in response to actuation of the incident trigger, defining an incident identifier. In some cases this is an alphanumeric identifier which is able to be associated with files (such as video recordings and screen captures) made by the DVM system. In other cases the identifier may be defined by a file folder in which such files are stored. However, it will be appreciated that the former approach is advantageous in the sense that the files are readily identifiable in an incident centric manner (based on the identifier) and in conventional DVM system manners (based, for example, on other properties of the files, such as time, camera, camera server, and so on). In some cases defining an incident identifier includes selecting one of a plurality of pre-created identifiers to for use in the current incident.

Functional block 302 represents a process including, during a period of time for which the incident trigger is actuated, applying an incident recording protocol. Application of this incident recording protocol causes the DVM system to automatically make recordings in accordance with the incident recording protocol. This may include any of (i) making recordings that would not have been otherwise made; (ii) making recordings at a different quality compared to what would have been made by default (for example where a camera is always configured to record at a background level); or (iii) determining that a recording that would have otherwise have been made by default is to be associated with the incident identifier. That is, the concept of "automatically making recordings" should be afforded a broad interpretation.

In terms of the period of time, that is in some cases defined by an "incident end" event. For example, this in some embodiments includes the operator clicking button 216 a further time to indicate that the incident is ended. In other cases the end of an incident is determined by different factors, which may be automatically determined.

As noted, the incident recording protocol defines a set of rules for automatically making recordings. These may include recordings from one or more cameras, and/or recordings of activity at the client terminal. The recordings are, in the present embodiment, made under the control of an incident-based recording control module 251. That is, module 251 implements the rules thereby to coordinate the making of automated recordings (which may include instructing a camera server to begin recording, modify recording parameters for a given camera, and/or associate an existing recording with the incident identifier). Various exemplary rules are outlined below:

A rule to set a predefined minimum level of low-quality background recording for all, or a selected group, of the cameras.

Figure 3B:
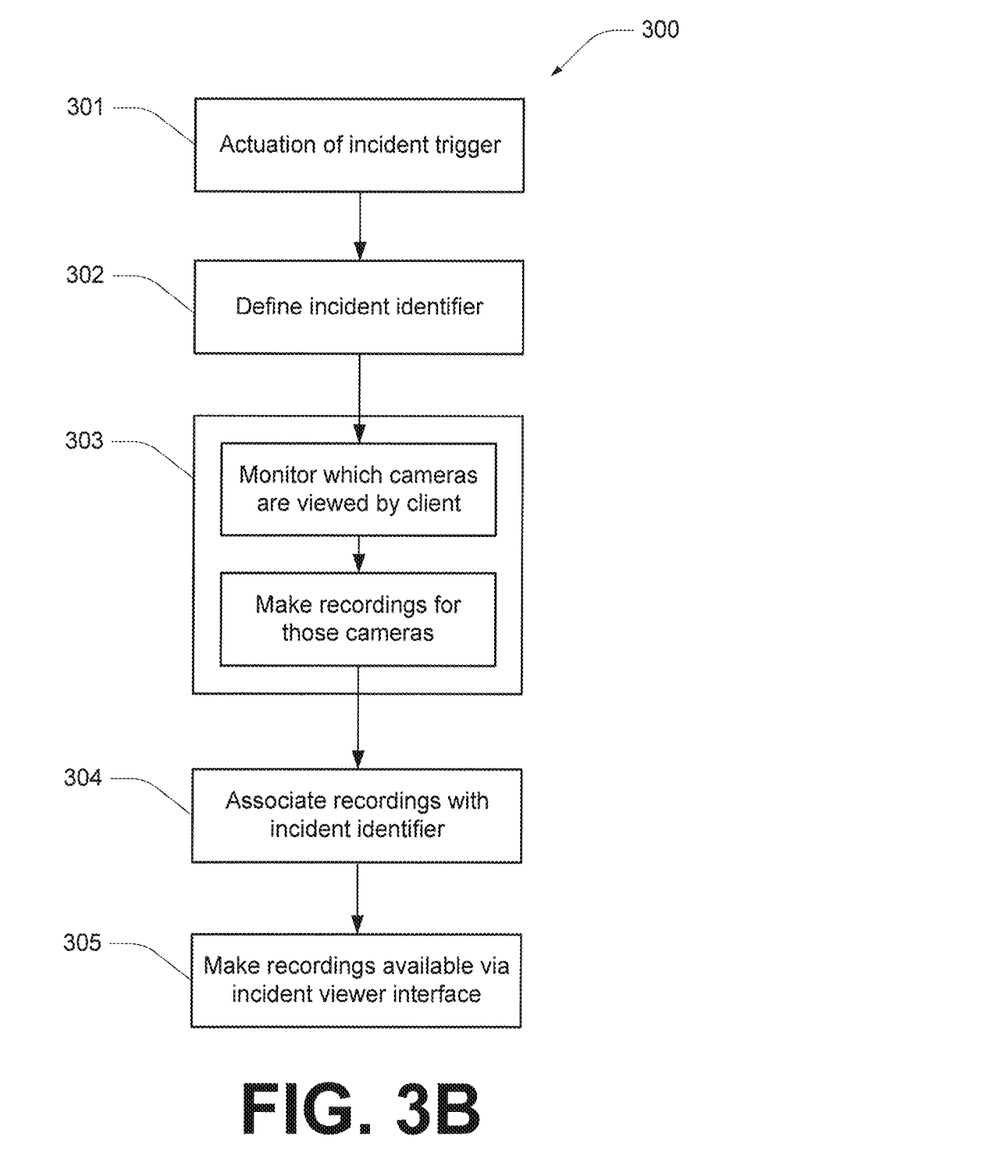
FIG. 3B illustrates a method according to one embodiment.

A rule to make recordings for all cameras currently being viewed by an operator of the terminal. For example, as shown in FIG. 3B, functional block 303 may include monitoring activity at a DVM client (for example using a client monitor module 252), identifying a set of one or more cameras for which live video is being accessed by the DVM client (for example in object 212 and objects 213A-E), and making recordings for the cameras in that set. That is, recordings are made to correspond with what the operator views. This allows the operator to focus on switching between views thereby to monitor the incident, without needing to be concerned with manually making recordings; the operator can rest assured that recordings are being made for everything he/she observes in the user interface.

A rule to make recordings of activity at a DVM client. For example, this may include making recordings defined by screenshots of the DVM client user interface 210. This may include sequential screenshots that define a video of what is presented to the user of the DVM client during the period of time for which the incident trigger is actuated. Such a video allows subsequent review of what the operator saw, how the operator reacted, and so on. In some cases logic is used thereby to recreate such a video using an approach other than screen capture (for example based on data indicative of what video was being displayed in each object at specific times, and use of automated recordings from the relevant cameras).

Additional rules may also be used, including rules relating to specified important cameras, cameras in regions proximal those viewed when the incident trigger is actuated, and so on. The concept of "recordings" should be interpreted broadly enough to cover both video and image recordings, in addition to other data (such as map data, location data, access card data from an associated access control system, and so on).

As indicated by functional block 304, recordings made in accordance with the incident recording protocol are associated with the incident identifier defined at 302. It will be appreciated that, in practice, this preferably occurs in real time as recordings are made, as opposed to as a separate and subsequent step once the incident is over.

Functional block 305 represents a process whereby recordings are made available via an incident viewer interface. For example, server 204 provides an incident viewer module 253 for providing a user of a client terminal with access to all of the recordings associated with a given incident identifier. Preferably, a user is enabled to search for or browse incidents based on incident parameters other than only incident identifier, such as based on date and/or time. In this regard, each incident is associated with a start time (based on the time of actuation of the incident trigger). Each incident may additionally be associated with an operator responsible for actuating the incident trigger, and/or other parameters.

In some embodiments functionality is provided to export an incident package including all recordings having the incident identifier. This preferably includes identifying the relevant recordings, converting them into a standard video format such as MPEG or AVI (if required), and exporting the converted recordings (for example to a portable carrier medium such as a flash drive, CD, DVD or the like). This is particularly useful if incident recordings are to be provided to a third party, such as the police.

Incident Viewing

In some embodiments, "incident packages" are generated for each incident. An incident package is a file, for example an XML based file, which contains information describing data associated with an incident (for example locations for such data, and context regarding the relationship of the data to the incident). For example, this data is indicative of recordings that are pre-associated with a defined incident, and a set of cameras responsible for the set of recordings that are pre-associated with the defined incident. In some cases this is defined in terms of the cameras, and in terms of recording time periods for each of the cameras. In any case, the data ultimately enables identification of recordings associated with the incident. In some embodiments the incident package is indicative of further data (such as snapshot images, snapshot image locations, map locations, alarms, audit information, analytics data, and the like).

A user is enabled to select an incident package, and provide a command to launch the incident package in the DVM user interface. For example, this may be achieved by a "drag and drop" operation whereby the incident package (or a graphical object representative thereof) is dropped onto a DVM user interface workspace area. In general terms, this command results in a reconfiguration of the DVM user interface such that the user interface is specifically configured to enable review of the incident package. Specifically, initially the user is provided with a first configuration of the DVM user interface at a client terminal operated by a user (which may be, for example, either a default configuration for accessing DVM data for the associated DVM system as a whole, or a DVM user interface tailored to allow viewing of another specific incident package), and in response to the command, the user is provided with a second configuration of the DVM user interface, wherein the second configuration of the DVM user interface is specifically configured to enable review of incident package associated with the command.

In terms of what is meant by a user interface "specifically configured to enable review of incident package associated with the command", this means that the user interface displays a lesser amount of information than would be typically provided for general use, thereby to make it easier for an operator to review the recordings (and optionally other data) of a specific incident package. In some embodiments, configuring the user interface for reviewing a specific incident package includes filtering data displayed by one or more components provided via the user interface. For example, this may include any one or more of the following:

Camera filtering: filtering may include includes filtering access to cameras based on the set of cameras responsible for the set of recordings that are pre-associated with the defined incident. For example, where the user interface includes a component for enabling selection of one or more cameras, filtering causes that component to display only cameras relevant to the incident package (for example only cameras responsible for recordings associated with the incident package).

Recording filtering: filtering may include filtering access to recordings based on the set of recordings that are pre-associated with the defined incident. This filtering may occur in an object configured to enable selection of recordings for viewing and/or on a timeline onto which recordings are loaded or pre-loaded.

Timeline filtering: a timeline display component may be filtered to show only times for which recordings exist in the incident package, for example based upon timing information for the set of recordings of which the incident package is indicative.

Various examples of how user interface configuration is achieved in certain embodiments are discussed below. An exemplary user interface is provided in FIG. 4A.

Figure 4A:
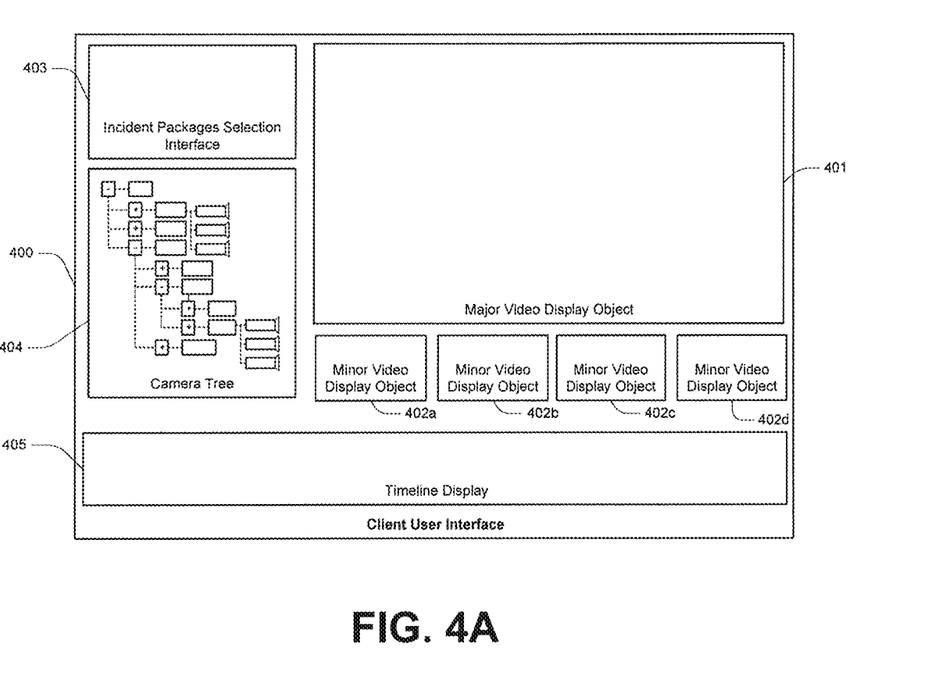
FIG. 4A illustrates an exemplary screenshot according to one embodiment.

FIG. 4A illustrates an indicative screenshot from a user interface 400 intended to illustrate concepts discussed below. It will be appreciated that only a small selection of components and controls are illustrated for the sake of simplicity. Interface 400 includes a major video display object 401 and a plurality of minor video display objects 402*a*-402*d*. These are configured for rendering recorded video data from cameras in the DVM system.

Item 404 represents a user interface component configured to allow selection of cameras in the DVM system. Specifically, this takes the form of a hierarchical structure that is configured to present objects representing cameras in the DVM system, referred to as a "camera tree". The manner by which the hierarchy is configured varies between embodiments. For example, cameras may be organized by reference to locations in a building, or by other characteristics.

Item 405 represents a timeline display component. This enables a user to track to specific points in time, defined by reference to video recordings. In some cases the timeline display component is configured to display graphical objects representing multiple recordings from respective cameras, such that a user is informed for which cameras recordings exist at specific times. In cases where both major and minor display objects are used, playback of recorded video data via these objects is preferably synchronized based on the timeline display. That is, by tracking to a desired timecode point using the timeline display, recordings being viewed via all display objects are progressed to a point corresponding to that timecode.

In some embodiments, configuration of the DVM interface for viewing of a specific incident package includes filtering the camera tree (item 404), this being a hierarchical structure that is configured to present objects representing cameras in the DVM system. This filtering is such that the hierarchical structure presents only objects representing the set of cameras responsible for the set of recordings that are pre-associated with the defined incident. So, by way of example, in a default configuration (for "normal" viewing of DVM system data, including live view and/or recordings) the camera tree allows access to all cameras in the DVM system. This may be a large number of cameras, organized amongst a large number of branches (for example branches based on locations). Upon launching an incident package, the camera tree is filtered to display cameras relevant to the incident package, and only tree portions containing those cameras. This greatly streamlines and simplifies navigation of the tree structure in the specific context of that incident package.

The manner in which the camera tree is used varies between embodiments. For example, the user interface may enable a user to drag and drop camera icons onto video display objects and/or the timeline thereby to effect viewing of recordings.

Figure 5:
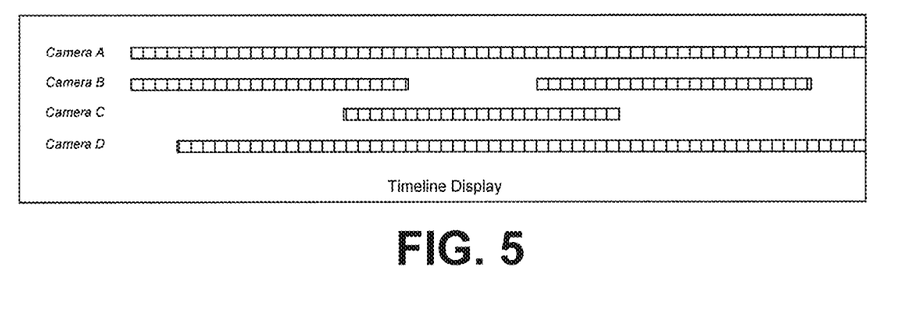
FIG. 5 illustrates an exemplary timeline display component.

In some embodiments configuration of the DVM interface for viewing of a specific incident package includes populating a timeline component with a set of cameras defined by those cameras responsible for the set of recordings that are pre-associated with the defined incident, and filtering the timelines thereby to show only the set of recordings that are pre-associated with the defined incident. For example, as shown in FIG. 5, a timeline display is loaded with multiple filmstrip previews, associated with respective cameras, showing incident-package-related recordings for those cameras relative to a common timeline.

Figure 4B:
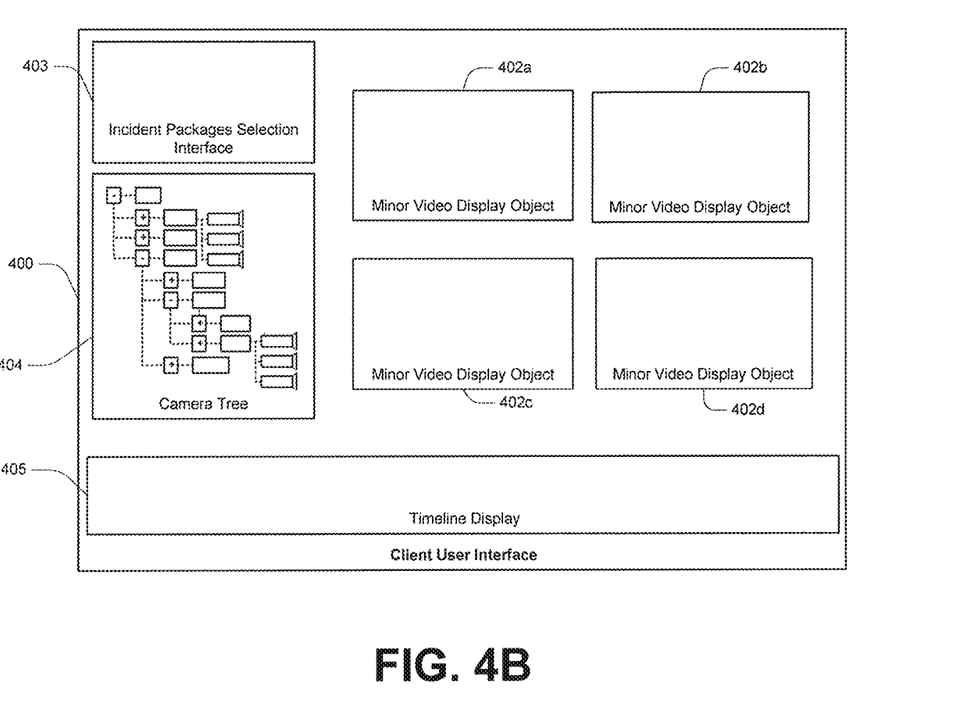
FIG. 4B illustrates an exemplary screenshot according to one embodiment.

In some embodiments configuration of the DVM interface for viewing of a specific incident package includes generating a multi-camera view for display via the DVM user interface, wherein the multi-camera view is defined by a set of video display objects corresponding to the determined number of cameras thereby to enable simultaneous synchronized playback of the set or recordings. For example, a plurality of potential video display object arrangements ape predefined, and one of these selected based upon a selection algorithm. By way of example, FIG. 4B shows a multi-camera view configured for simultaneous synchronized playback of recordings from four cameras.

Incident Export

In some embodiments, a DVM system component is configured for enabling exporting of incident packages for viewing via standalone interfaces that are independent of a DVM system. In this regard, an interface that is "independent of a DVM system" is a user interface that (resembles an DVM user interface (for instance as shown in FIG. 4A or FIG. 4B), but which is not operatively linked to a DVM system (for example it does not provide access to live view, or access to a full database of recordings). Rather, the standalone interface is configured to enable viewing of a limited selection of DVM data, based upon an incident package.

In this regard, one embodiment provides a method for exporting an incident package in a viewable form. The method includes identifying an incident package, this being indicative of a set of recordings that are pre-associated with a defined incident, and a set of cameras responsible for the set of recordings that are pre-associated with the defined incident. The method then includes defining data for enabling population of a DVM user interface with: (i) a hierarchical structure configured to present objects representing the set of responsible for the set of recordings that are pre-associated with the defined incident; and (ii) a timeline onto which the set of recordings are loaded. In this manner, a standalone interface is able to provide a DVM interface that is configured to allow viewing of the incident packages in a similar manner as to in examples considered further above. However, whereas in those examples an interface is "trimmed down" via filtering thereby only to display relevant cameras and recordings, in this case an otherwise empty interface is populated only with the information to display the relevant cameras and recordings.

Again, DVM user interface enables preferably synchronized playback of the set of recordings loaded onto the timeline. This may be simultaneous via a multi-camera view, for example by including in the exported incident package data (for example a code or schema) indicative of an appropriate multi-camera view.

CONCLUSIONS AND INTERPRETATION

It will be appreciated that the disclosure above provides various significant systems and methods for managing video data. For example, the present embodiments allows for improved control of DVM systems, thereby to enable incident package review.

Unless specifically stated otherwise, as apparent from the following discussions, it is appreciated that throughout the specification discussions utilizing terms such as "processing," "computing," "calculating," "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for controlling a Digital Video Management (DVM) user interface associated with a DVM system, the method comprising:
   providing a first configuration of the DVM user interface at a client terminal operated by a user;
   enabling the user to select an incident package, wherein the incident package is indicative of:
      a set of recordings that are pre-associated with a particular incident using a common incident identifier;
      a set of cameras responsible for the set of recordings that are pre-associated with the particular incident;
      wherein each recording in the set of recordings is pre-associated with location data and access card data, and wherein the set of recordings are automatically made in accordance with an incident recording protocol;
      wherein the incident recording protocol defines a predefined minimum quality level of recording for the set of cameras that are pre-associated with the particular incident;
      wherein the common incident identifier is an alphanumeric identifier, and wherein the common incident identifier is assigned to each recording in the set of recordings in real time as recordings are made;
   the incident package further includes defining data for enabling reconfiguration of the DVM user interface based upon:
      (i) a hierarchical structure configured to present objects representing the set of cameras responsible for the set of recordings that are pre-associated with the defined incident; and
      (ii) a timeline onto which the set of recordings are loaded;
   enabling the user to provide a command to launch the incident package in the DVM user interface, wherein the command is achieved by a drag-and-drop operation wherein a graphical object representative of the incident package is dropped onto the first configuration of the DVM user interface; and
   in response to the command, reconfiguring the first configuration of the DVM user interface based on the defining data of the incident package to provide a second configuration of the DVM user interface, wherein the second configuration of the DVM user interface is configured to enable review of the incident package.

2. A method according to claim 1, wherein providing the second configuration of the DVM user interface includes filtering data displayed by one or more components provided via the first configuration of the DVM user interface.

3. A method according to claim 2, wherein the filtering includes filtering recordings based on the set of recordings that are pre-associated with the particular incident.

4. A method according to claim 2, wherein the filtering includes filtering access to cameras based on the set of cameras responsible for the set of recordings that are pre-associated with the particular incident.

5. A method according to claim 2, wherein the filtering includes filtering a timeline based upon timing information for the set of recordings that are pre-associated with the particular incident.

6. A method according to claim 1, wherein providing the second configuration of the DVM user interface includes filtering a hierarchical structure that is configured to present objects representing cameras in the DVM system such that the hierarchical structure presents only objects representing the set of cameras responsible for the set of recordings that are pre-associated with the particular incident.

7. A method according to claim 1, wherein:
   the first configuration of the DVM user interface includes a hierarchical structure configured to present objects representing a first set of cameras in the DVM system; and
   the second configuration of the DVM user interface includes a hierarchical structure configured to present objects representing a second set of cameras in the DVM system, wherein the second set of cameras is defined by the cameras responsible for the set of recordings that are pre-associated with the particular incident.

8. A method according to claim 7, wherein the first set of cameras is defined by all cameras in the DVM system.

9. A method according to claim 1, wherein the second configuration of the DVM user interface includes a timeline onto which the set of recordings that are pre-associated with the particular incident are loaded.

10. A method according to claim 9, wherein the timeline enables synchronised playback of a plurality of the recordings of the set of recordings.

11. A method according to claim 1, wherein providing the second configuration of the DVM user interface includes:
   populating a timeline component with a set of cameras defined by those cameras responsible for the set of recordings that are pre-associated with the particular incident; and
   filtering the timeline component thereby to show only the set of recordings that are pre-associated with the particular incident.

12. A method according to claim 1, wherein providing the second configuration of the DVM user interface includes:
   determining a number of cameras in the set of cameras responsible for the set of recordings that are pre-associated with the particular incident; and
   generating a multi-camera view for display via the DVM user interface, wherein the multi-camera view is defined by a set of video display objects corresponding to the determined number of cameras thereby to enable simultaneous synchronised playback of the set of recordings that are pre-associated with the particular incident.

13. A method for exporting an incident package in a viewable form, the method comprising:
   identifying an incident package, wherein the incident package is indicative of:
      a set of recordings that are pre-associated with a particular incident using a common incident identifier;
      a set of cameras responsible for the set of recordings that are pre-associated with the particular incident;
      wherein at least one of the recordings in the set of recordings is pre-associated with access card data;
      wherein the common incident identifier is an alphanumeric identifier, and wherein the common incident identifier is assigned to each recording in the set of recordings in real time as recordings are made;
   defining data for enabling reconfiguration of a Digital Video Management (DVM) user interface when a command is provided by a user to launch the incident package, the command achieved by a drag-and-drop operation, the defining data including:
(i) a hierarchical structure configured to present objects representing the set of cameras responsible for the set of recordings that are pre-associated with the particular incident using the common incident identifier while filtering out objects representing cameras not responsible for the set of recordings that are pre-associated with the particular incident; and
(ii) a timeline onto which the set of recordings are loaded.

14. A method according to claim 13, wherein the DVM user interface enables synchronised playback of the set of recordings loaded onto the timeline.

15. A Digital Video Management (DVM) system comprising:
a memory for storing a plurality of incident packages;
a controller operatively coupled to the memory, the controller configured to:
provide a first configuration of a DVM user interface on a display;
allow a user to select an incident package from the plurality of incident packages, wherein the selected incident package is indicative of:
a set of recordings that are pre-associated with a defined incident using a common incident identifier;
a set of cameras responsible for the set of recordings that are pre-associated with the defined incident;
wherein at least one of the recordings in the set of recordings is pre-associated with access card data, and wherein the set of recordings are automatically made in accordance with a pre-defined incident recording protocol;
wherein the common incident identifier is an alphanumeric identifier, and wherein the common incident identifier is assigned to each recording in the set of recordings in real time as recordings are made;
allow the user to provide a command to launch the selected incident package in the DVM user interface, wherein the command is achieved by a drag-and-drop operation wherein a graphical object representative of the incident package is dropped onto the first configuration of the DVM user interface;
in response to the command, reconfiguring the first DVM user interface based on defining data of the selected incident package to provide a second configuration of the DVM user interface on the display, wherein the second configuration of the DVM user interface is configured to enable review of the selected incident package;
wherein the first configuration of the DVM user interface includes a hierarchical structure configured to present objects representing a first set of cameras in the DVM system; and
the second configuration of the DVM user interface includes a hierarchical structure configured to present objects representing a second set of cameras in the DVM system, wherein the second set of cameras is defined by the defining data of the selected incident package and represent the cameras responsible for the set of recordings that are pre-associated with the defined incident of the selected incident package.

16. A DVM system according to claim 15, wherein the pre-defined incident recording protocol defines one or more characteristics of the set of recordings that are pre-associated with the defined incident of the selected incident package.

17. The DVM system according to claim 16, wherein the one or more characteristics defined by the pre-defined incident recording protocol includes a minimum quality level of recording for the set of cameras that are pre-associated with the defined incident of the selected incident package.

18. A DVM system according to claim 15, wherein the first set of cameras is defined by all cameras in the DVM system.

19. A DVM system according to claim 15, wherein the second configuration of the DVM user interface includes a timeline onto which the set of recordings are loaded.

20. A DVM system according to claim 15, further comprises filtering a hierarchical structure that presents objects representing cameras in the DVM system such that the hierarchical structure presents only objects representing the set of cameras responsible for the set of recordings that are pre-associated with the defined incident in the second configuration of the DVM user interface.

* * * * *